Dec. 9, 1930.   G. FROVA   1,784,347
FRUIT PITTING MACHINE
Filed Nov. 26, 1927   3 Sheets-Sheet 2

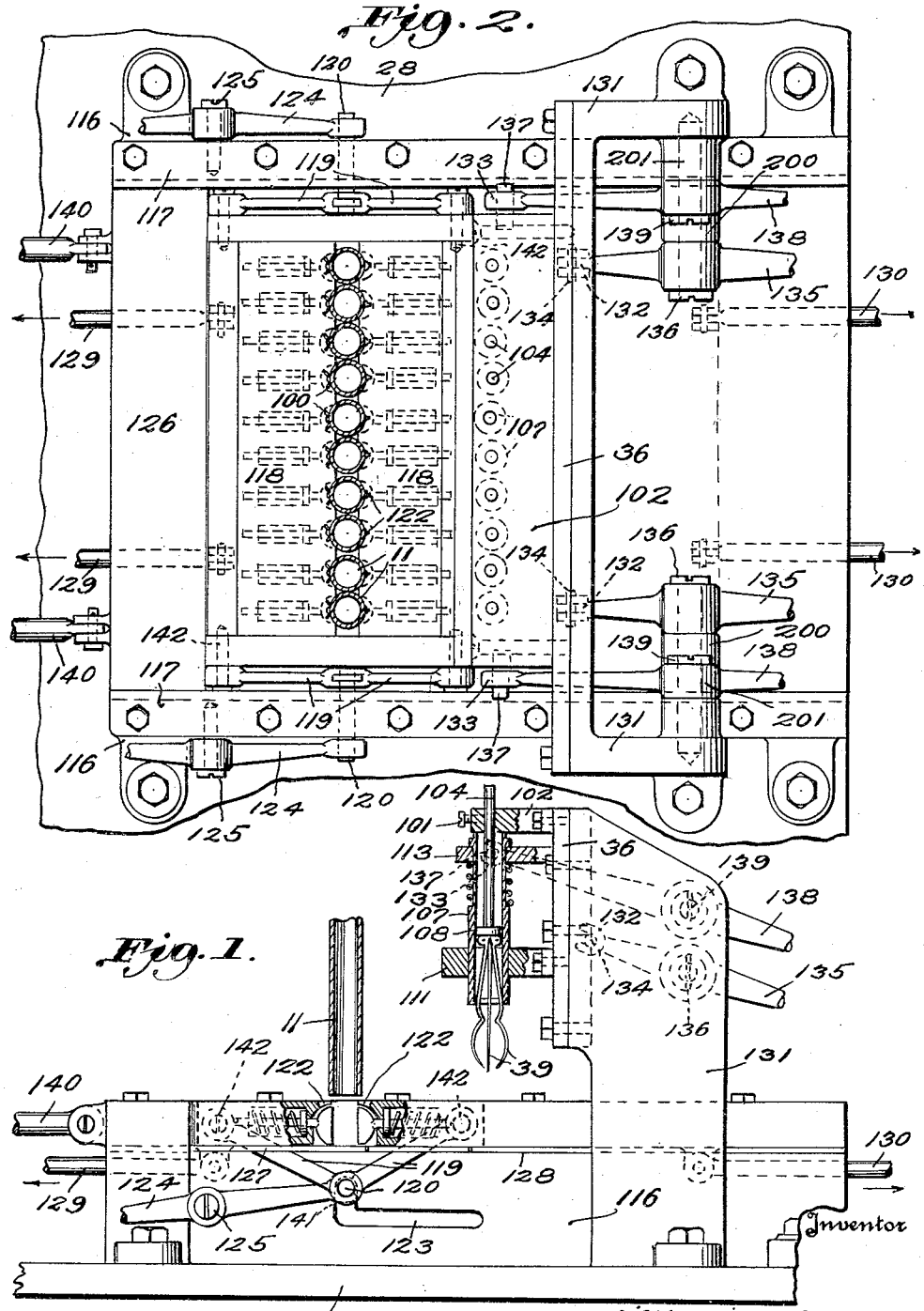

Inventor
GIOVANNI FROVA
By Steward & McKay
his Attorneys

Dec. 9, 1930.   G. FROVA   1,784,347
FRUIT PITTING MACHINE
Filed Nov. 26, 1927   3 Sheets-Sheet 3
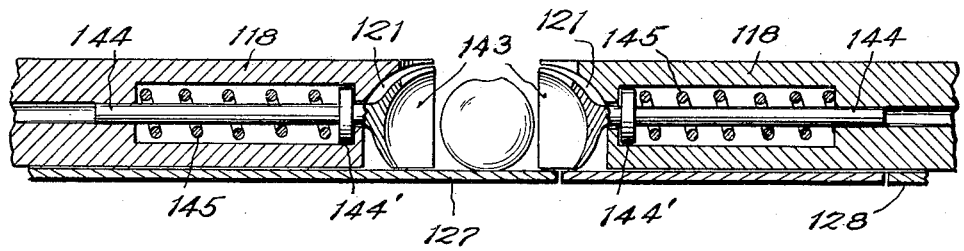
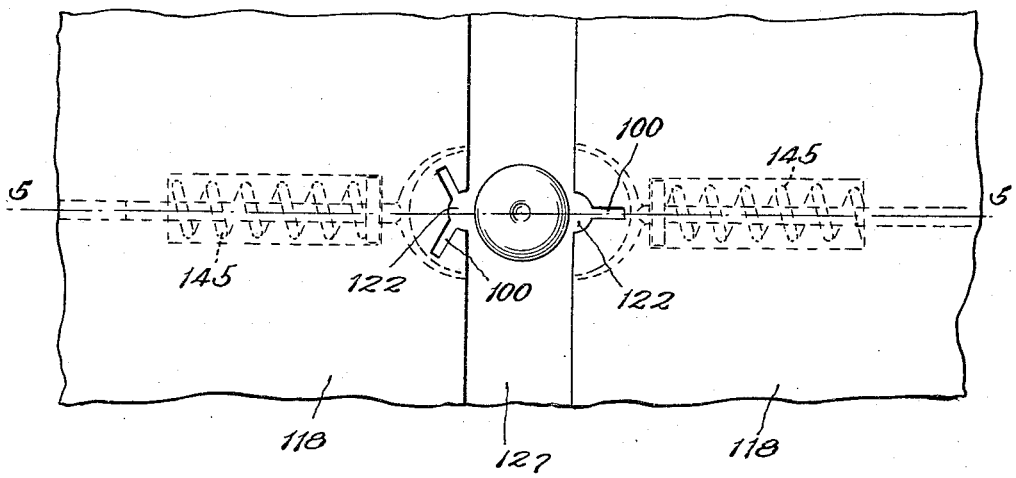
Inventor
GIOVANNI FROVA,
By Steward & McKey
Attorneys Patented Dec. 9, 1930

1,784,347

UNITED STATES PATENT OFFICE

GIOVANNI FROVA, OF MILAN, ITALY

FRUIT-PITTING MACHINE

Application filed November 26, 1927, Serial No. 235,974, and in Italy October 17, 1925.

The present invention relates to fruit pitting machines.

It has for its object a machine characterized in that it comprises means to receive and grasp the fruit to be pitted consisting of two parallel and horizontally movable blocks provided in the sides facing one another with symmetric curved recesses and adapted to be moved away from one another for permitting the fruits to fall between them, the blocks then being moved toward one another to yieldingly grasp the fruits enclosed in said recesses, said blocks finally being moved in closed position to position the grasped fruits in front of vertically movable pit and stem removing means of the kind disclosed and broadly claimed in my Patent No. 1,698,477, dated January 8, 1929.

The machine comprises also a horizontally reciprocating carriage on which said blocks are slidably arranged, said carriage adapted to be reciprocated along the machine frame together with the blocks when said blocks are in closed position. Further the machine comprises two horizontal plates slidably mounted on the machine frame beneath said carriage and adapted to be alternatively brought together for supporting the fruits enclosed in the recesses of said blocks and thereafter separated for permitting the fruits to be pitted and the pits extracted to fall down in suitable collectors.

Other characteristic features of the machine construction and of the controlling means for the blocks, carriage and plates above referred to will be described hereafter.

The invention will be more readily understood from the following description with reference to the accompanying drawings, wherein:

Fig. 1 is a side view partially in section showing the fruit grasping member in open position, ready for starting work.

Fig. 2 is a plan view, some parts being omitted.

Figs. 5 and 6 are enlarged fragmentary sectional and plan views, respectively, of the grasping members.

Figure 4:
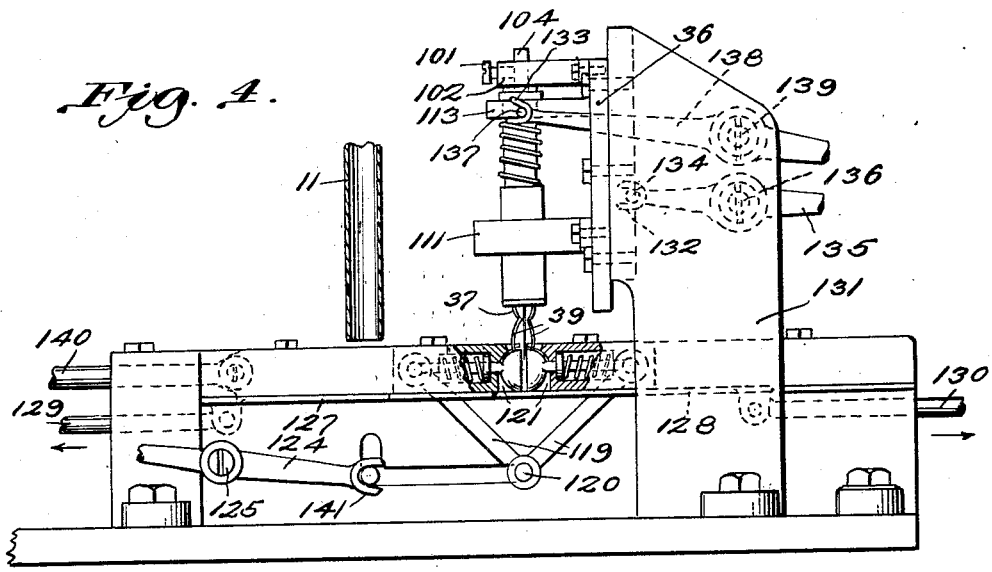
Fig. 4 is a view like to Fig. 1, but showing the fruit grasping members in closed position.

To the vertical sides 116 secured to the machine base 28 is arranged a horizontally movable carriage 126 sliding along guides 117 extending laterally from the sides 116. On the carriage are slidably mounted, so that they can be moved toward or separated from each other, two elongated parallel blocks 118, the ends of which are interconnected by pairs of connecting links 119, these links being of equal length and hinged to one another by pivots 120. The links 119, as shown in Fig. 1 are connected with the blocks by means of cross rods or pivots 142. Plungers 143 are mounted within bored recesses in the block to be reciprocated with respect thereto and on the projecting stem 144 of each plunger 143 a spiral spring 145 is positioned one end of which bears against the collar 144' on the plunger and the other against a flange of the said bore in the block 118 with the object of suiting the position of the plungers 143 to the size of the fruits to be received and grasped.

The pivots 120 connect each pair of links 119, said pivots projecting laterally through L-shaped slots 123 consisting of vertical and horizontal portions formed in the machine sides 116.

Figure 3:
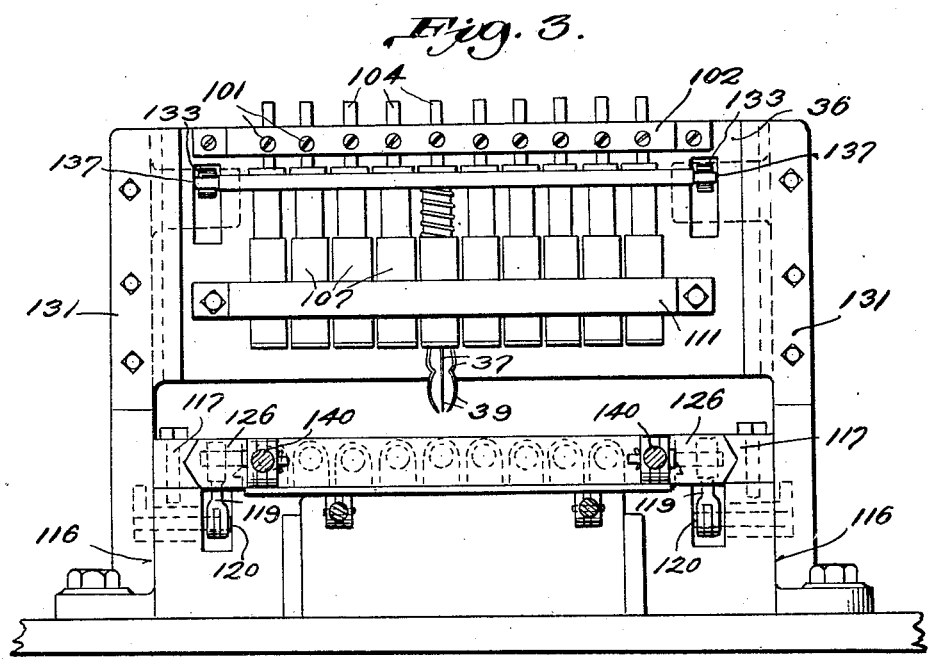
Fig. 3 is a front elevation of the machine, some parts being omitted.

In the adjacent ends of blocks 118 there are formed large concave recesses 121 (Figs. 1 and 4) symmetrically arranged relatively to the plungers 143. Said recesses 121 may extend downwardly to the underside of the blocks 118. At the upper edge of the recesses 121 (Fig. 3) semi-circular notches 122 are formed and extending from these notches are radial cuts or slots 100 (Fig. 2), so that when the two blocks 118 are brought in contact with each other, openings of suitable diameter result in their top face and below each hole there extends a practically semispherical recess for reception of the fruits to be pitted.

In the open position of the grasping members, the portions of the pivots 120 projecting from the links 119 into the slots in the machine sides 116 lie between the prongs of forks 141 (Figs. 1 and 2) formed on the ends of levers 124 fulcrumed on pins 125 projecting from the sides 116. The opposite ends of the levers 124 rest on cams, eccentrics or the like actuated from the machine main shaft (not shown) for the purpose of imparting a swinging movement to said levers at stated time intervals.

Under the blocks 118 and carriage 126 two plates 127 and 128 are arranged. These plates are guided on the machine frame, on which they can slide horizontally. The two plates are actuated by rods 129 and 130 respectively and by eccentrics, cams or the like which, at stated time intervals, push forward or bring back the rods 129 and 130 for the purposes that will be set forth below.

A support 131 secured to the sides 116 or to the machine base 28 carries at the rear of the machine a vertically reciprocating carriage 36 fitted with bored supports 111 for the sliding sleeves 107 enclosing the rods 104 and providing guideways for heads 108 on the rods, upon which heads are pivotal connections for the arms 37 carrying the pit and stalk extracting blades 39. To the reciprocating carriage 36, a cross-bar 102 is secured and to this bar are connected by means of set screws 101 the upper ends of the rods 104, which extend above the sleeves 107.

The sleeves 107 are connected to a cross bar 113. As will be seen, the pit and stem extracting devices shown are of the same design and work practically in the same manner as the devices described and shown in my aforesaid Patent No. 1,698,477. The carriage 36 and cross bar 113 are operated in the following manner:

The carriage 36 is provided, at the rear, with pins 134 (Figs. 1, 2 and 4) engaged by the forked ends 132 of the levers 135 swinging about pins 136 projecting from brackets 200 fixed to the support 131. The opposite ends of the levers 135 are actuated by eccentrics, cams or the like (not shown) for imparting an intermittent vertical reciprocating motion to the carriage 36, similar to the horizontal motion imparted to the carriage described and shown in the above mentioned patent.

Pins 137, extending from the ends of the cross bar 113, are engaged by the forked ends 133 of levers 138 swinging about pins 139 projecting from brackets 201 fixed to the sides of the said support 131. The opposite ends of the levers 138 are actuated by eccentrics, cams or the like, (not shown) for the purpose of swinging the said levers and displacing the cross bars 113 so as to operate the arms 37 and the cutting blades 39, exactly as described and shown in the copending application abovesaid.

The working of the machine is as follows:

On starting, the various machine parts occupy the position shown in Fig. 1. The fruits coming from a distributing device (not shown) are guided by the downtake tubes 11, of which there is one for each recess in the blocks 118, drop into the said recesses 121 and rest on the plate 127 with their stems extending upwardly and lying, practically, on the vertical center line of the tubes 11. Centering devices may be used to bring the stalks into the said position as in the above mentioned patent.

Directly after this the lever 124, by means of the fork 141, lowers the pivot pins (or rods) 120 in the vertical portion of the angle-shaped slots 123. This reduces the angle formed by the link pairs 119 and consequently moves the blocks 118 toward each other until they close upon the fruits, the stems projecting to the outside through the holes 122. Now an eccentric cam or the like (not shown) operating rod 140, moves the carriage 126 and the closed blocks 118 forward till these plates occupy such a position that the centres of the holes 122 coincide with the longitudinal center lines of the pit and stem extractors 39 (Fig. 4). During the said forward movement the ends of the pins (or rods) 120 have been released by the forks 141 and will be guided by the horizontal portion of the slot 123 in their lowered position. At the end of the stroke the carriage 126 and the closed blocks 118 will stand still just the time requisite for the cutting blades 39 to be lowered into the fruits, to grip the pits, to rise again for removing the pits and stems in the manner described and shown in above said copending application.

As already stated the various parts of the pit and stem extracting devices are actuated at stated time intervals, by eccentrics, cams or the like in conjunction with the levers 135 and 138.

Directly after the pits and stems have been extracted, the carriage 126 is moved backward and restores the blocks 118 to their former position. When the pins 120 have completed their backward stroke they are again engaged by the forks 141 of the levers 124 which, as already mentioned, had released themselves therefrom. As soon as the pins are again engaged by the forks, the levers 124 are swung so that the forks, and therewith also the pins 120, are raised. As a result the angle comprised by the links in each pair of links becomes greater, the blocks 118 thus being separated from each other. At this moment the eccentrics, cams or the like connected to the rods 129 and 130 come into action and draw these rods in the directions indicated by the arrows in Fig. 2. The said rods will draw the plates 127, and 128 respectively, in the same direction. As the carriage 126 essentially is a frame, the withdrawal of the plates 127 and 128 will establish a free passage between the upper and lower portion of the machine and will allow the pitted fruits as well as the extracted pits and stems to drop into underlying separate receptacles (not shown). The plates 127 and 128 are quickly restored to their initial positions and they are ready for the starting of another cycle.

It is obviously understood that the machine concerned as well as its driving and motion transmitting parts admit of any modifications that may be suggested by experience or by persons skilled in the art. Such modifications accordingly lie within the compass of the present invention.

Thus for example, instead of various devices for receiving and grasping fruits and for gripping and extracting pits from fruits, the machine can be constructed with only one of said two devices.

While in the accompanying drawings I have shown a preferred embodiment of my machine, my invention is not limited thereto, and it embraces all modifications falling within its scope.

Moreover I aim especially to be protected for the single devices for receiving and grasping fruits and for gripping and extracting pits from fruits, said devices being employed together or separately or in conjunction with other known devices.

Having now particularly described and ascertained the nature of my said invention and in what manner the same is to be used, I declare that what I claim is:

1. A fruit pitting machine comprising means for initially supporting fruit to be pitted, means for feeding fruit in predetermined position to such supporting means, means for grasping fruit on such supporting means, and means for grasping and removing pits from the fruit, and means for reciprocating said fruit grasping means between said fruit feeding means and said fruit pitting means.

2. A fruit pitting machine comprising, in combination, a carriage, slidable fruit holding members movably mounted on said carriage, means for feeding fruit into said holding members with the stems of said fruit uppermost, means for grasping and removing the pits from the fruit without removing substantially any pulp, and means for reciprocating the carriage between said fruit feeding means and said pit removing means.

3. A fruit pitting machine comprising means for holding fruit to be pitted, means for feeding fruit to such holding means, such holding means being movably arranged on a reciprocating carriage constituted by mechanically actuated recessed blocks, and pitting mechanism comprising power actuated tongs adapted to radially cut into the fruit and remove the pits therefrom without substantial mutilation of the fruit.

4. In a fruit pitting machine, a frame provided with side members each having slots extending at angles with respect to each other, a reciprocating carriage mounted on said frame, sliding plates mounted on said carriage for initially supporting fruit to be pitted, recessed blocks slidably mounted on said carriage for grasping and holding the fruit to be pitted initially supported by said plates, levers connecting said recessed blocks, said levers being connected by pivot pins each extending into one of said slots, and means for moving said pins in said slots to cause said recessed blocks to open and close.

5. In a fruit pitting machine, in combination, fruit feeding means, pitting means, a carriage, recessed blocks slidably mounted on the carriage for receiving fruit to be pitted from said feeding means and for grasping the fruit, slidable plates mounted beneath said carriage for initially supporting the fruit, and means for reciprocating said carriage to present the fruit to said pitting means.

6. In a fruit pitting machine, in combination, fruit feeding means, pitting means, a carriage, recessed blocks slidingly mounted on the carriage for receiving fruit to be pitted from said feeding means, slidable plates mounted beneath said carriage for initially supporting the fruit, means for moving said blocks into grasping engagement with the fruit, and means for reciprocating said carriage to present the fruit to said pitting means.

7. In a fruit pitting machine, in combination, fruit feeding means, pitting means, a carriage, recessed blocks slidingly mounted on the carriage for receiving fruit to be pitted from said feeding means, slidable plates mounted beneath said carriage for initially supporting the fruit, pivoted links connecting said recessed blocks operable to open and close the latter whereby the blocks may be moved into grasping engagement with the fruit, and means for reciprocating said carriage to present the fruit to said pitting means.

8. A fruit pitting machine comprising a supporting machine frame, fruit feeding means associated therewith, a reciprocating carriage arranged on the machine frame, reciprocating fruit holding means arranged on said carriage, reciprocating means for supporting the fruit fed to said fruit holding means, means for periodically reciprocating said carriage along the machine frame, means for reciprocating said fruit holding means together with said carriage and with respect thereto, and means for reciprocating said fruit supporting means with the carriage and with respect thereto.

9. A fruit pitting machine comprising a supporting machine frame, fruit feeding means associated therewith, a reciprocating carriage arranged on the machine frame, reciprocating fruit holding means arranged on said carriage, reciprocating means for supporting the fruit fed to said fruit holding means, means for periodically reciprocating said carriage along the machine frame, means for reciprocating said fruit holding means together with said carriage and with respect thereto, and means for reciprocating said fruit supporting means with the carriage and with respect thereto, the reciprocation of said fruit supporting means being synchronized with reciprocation of said fruit holding means so that they reciprocate together for a portion of their movement and independently for another portion of their movement.

10. A fruit pitting machine comprising a supporting machine frame, fruit feeding means, a reciprocating carriage movable on the machine frame, reciprocating fruit holding means movable with said carriage and relatively thereto consisting of two transverse parallely arranged and symmetrically recessed blocks, and reciprocating fruit supporting means slidably arranged beneath said blocks and carriage and adapted to support the fruit discharged by said feeding means between the recesses of said blocks and operable to permit the fruit to be discharged from said holding means, and a pitting mechanism adapted to operate on the fruit while in said holding means.

11. A fruit pitting machine comprising a supporting machine frame, a reciprocating carriage movable on the machine frame, periodically reciprocating fruit holding means movable with said carriage and relatively thereto comprising two transverse parallelly arranged and symmetrically recessed blocks, means for delivering the fruit between said fruit holding means, and periodically reciprocating fruit supporting means slidingly arranged beneath said carriage and recessed blocks, comprising two slidable plates, and means to displace said plates periodically by moving them away from and toward each other.

12. A fruit pitting machine comprising a supporting machine frame, fruit holding means, pitting means, periodically reciprocating means for holding the fruit to be pitted and to present same to the pitting means comprising a reciprocating carriage slidably arranged on the machine frame and two transverse parallel and symmetrically recessed blocks movable with said carriage and relatively thereto, a pair of slidably arranged plates on the same plane and beneath said blocks and carriage for supporting the fruit to be pitted, and a plurality of pairs of pivoted links connecting said recessed blocks and operable to open and close said blocks.

13. A fruit pitting machine comprising a supporting machine frame, fruit feeding means, said machine frame including side walls having angle shaped slots therein, a periodically reciprocating carriage movable on said machine frame, a pair of periodically reciprocating transverse parallel and symmetrically recessed blocks slidably arranged on said carriage adapted to be positioned to hold in their symmetric recesses the fruit to be pitted, a pair of periodically reciprocating plates arranged beneath said carriage and recessed blocks adapted to support the fruit delivered by said fruit feeding means within the recesses of said blocks, a plurality of pairs of pivoted links connecting said blocks, pivot-pins connecting each pair of links, each pin engaging one of said angle shaped slots in the side wall of the machine frame, and operating means adapted to displace said pins in said slots so as to alternately close and open said blocks when the pins slide in a portion of said slots and to permit said blocks to be reciprocated in closed position when the pins are in the other portion of said slots.

14. A fruit pitting machine comprising a supporting machine frame, fruit feeding means, said machine frame including side walls having angle shaped slots therein, a periodically reciprocating carriage movable on said machine frame, a pair of periodically reciprocating transverse parallel and symmetrically recessed blocks slidably arranged on said carriage adapted to be positioned to hold in their symmetric recesses the fruit to be pitted, means carried by said blocks to yieldingly hold the fruit resting within the symmetric recesses when the blocks are in closed position, a pair of periodically reciprocating plates arranged beneath said carriage and recessed blocks adapted to support the fruit delivered by said fruit feeding means within the recesses of said blocks, a plurality of pairs of pivoted links connecting said blocks, pivot-pins connecting each pair of links, each pin engaging one of said angle shaped slots in the side wall of the machine frame, and operating means adapted to displace said pins in said slots so as to alternately close and open said blocks when the pins slide in a portion of said slots and to permit said blocks to be reciprocated in closed position when the pins are in the other portion of said slots.

15. In a fruit pitting machine, the combination with gravity fruit feeding means and a vertically arranged pitting means, of a horizontally reciprocating carriage to carry fruit from said feeding means to said pitting means, means arranged under said carriage to support the fruit fed thereto, and means for displacing said supporting means after the pitting means has operated upon the fruit.

16. A fruit pitting machine as set out in claim 12 in which the recessed blocks are provided with slots to permit the pitting means to enter the recesses in said blocks.

17. A fruit pitting machine as set out in claim 12 in which the recessed blocks are provided with spring-pressed plungers adapted to yieldingly engage the fruit in the recesses in said blocks when the blocks move together to grasp the fruit.

GIOVANNI FROVA.